No. 866,761. PATENTED SEPT. 24, 1907.
J. C. WILLIAMS.
MECHANICAL ENGINE.
APPLICATION FILED JAN. 17, 1907.
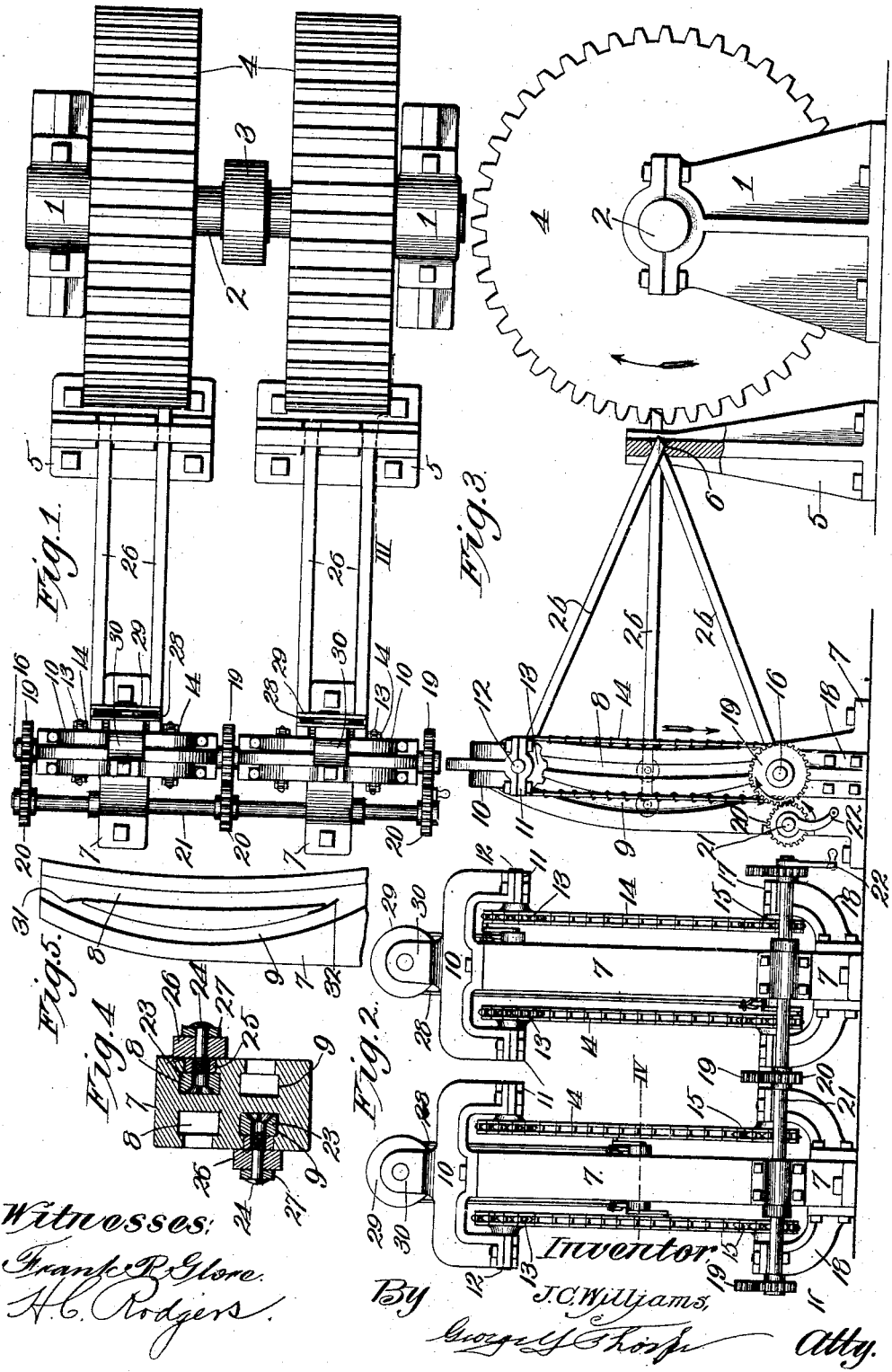
Witnesses:
Frank P. Glore.
H. C. Rodgers.
Inventor
J. C. Williams,
By George L. Thorpe
Atty.

UNITED STATES PATENT OFFICE.

JOHN C. WILLIAMS, OF KANSAS CITY, MISSOURI.

MECHANICAL ENGINE.

No. 866,761.  Specification of Letters Patent.  Patented Sept. 24, 1907.

Application filed January 17, 1907. Serial No. 352,735.

*To all whom it may concern:*

Be it known that I, JOHN C. WILLIAMS, a citizen of the United States, residing at Kansas City, in the county of Jackson and State of Missouri, have invented certain new and useful Improvements in Mechanical Engines, of which the following is a specification.

This invention relates to mechanical engines, and my object is to produce an engine which, under the application of a weak primary power, may be caused to develop power sufficient to operate any machinery.

A further object is to produce an engine of the character outlined which can be controlled readily and can be manufactured at low cost in proportion to the power which such engine may develop.

With these general objects in view and others of a tributary character, the invention consists in certain novel and peculiar features of construction and combinations of parts as hereinafter described and claimed; and in order that it may be fully understood reference is to be had to the accompanying drawing, in which—

Figure 1, is a plan view of an engine embodying my invention. Fig. 2, is a front view of the same. Fig. 3, is a side view with a part in section on dotted line III of Fig. 1 and with a part omitted. Fig. 4, is an enlarged horizontal section on the dotted line IV of Fig. 2; Fig. 5, is a side view of a part of one of the standards of the engine.

In the said drawings, 1 indicates bearing standards for a horizontal shaft 2 provided preferably at its center with means for transmitting motion, such for instance as a belt wheel 3. Rigidly secured on the shaft is a large cog wheel 4 shown in this instance in the form of two sections or wheels at opposite sides of and equal distances from the belt wheel 3. Forward of the wheels are standards 5, each provided with a plurality of openings 6 flared at both ends by preference, the bottoms of said openings forming fulcrums for the levers or pries hereinafter described, for turning the wheels.

7 indicates a pair of standards forward of the fulcrum standards, provided in their opposite sides with grooves or guideways 8 and 9 which meet at their ends, the guideways 9 being struck from the center of fulcrum holes 6 of standards 5 and guideways 8 from a center in the same horizontal plane as said holes 6 and the axis of the cog wheel, at such a radius that the distance between the center of said guideways 8 and the periphery of the cog wheel at the base of the teeth shall be about equal to the distance between the meeting ends of the guideways and the fulcrum holes 6 in the same vertical plane as such guideways, it being understood that each set of said guideways 8 and 9 is in the same vertical plane as one of the fulcrum holes, and it will also be noticed in this connection that the guideways are approximately T-shaped in cross section for a purpose which hereinafter appears, see Fig. 4.

10 indicates inverted-U shaped brackets secured rigidly upon the upper end of each standard 7, and forming in conjunction with bearing caps 11, journals for the longitudinally alined but transversely extending shafts 12, any suitable means being employed to guard against longitudinal movement or creepage of said shafts, and rigidly secured on the inner end of said shafts are small sprocket wheels 13 connected by sprocket chains 14 to sprocket wheels 15 on shafts 16, journaled in bearings formed by caps 17 and brackets 18, the latter being secured to opposite sides of the standards 7 below the guideways, it being also noted in this connection that one of the shafts 16 is journaled at its opposite ends in the contiguous brackets 18 of the two standards, in order that it may be equipped with a cog wheel 19 like the remaining shaft 16, said cog wheels meshing continuously with the cog pinions 20 on the power shaft 21 journaled in standards 7 and adapted to receive motion imparted by crank handle 22 or any other means.

23 indicates an anti-friction roller in the enlarged portion of each guideway and 24 a screw bolt forming a journal for each roller with its head countersunk therein and its threaded portion engaged by a nut 25 forming a washer between the roller and the lever or pry 26 journaled on the reduced outer end of the bolt and held thereon by a washer 27, the opposite end of said lever or pry being pivotally connected to the contiguous chain 14. The lever or pry has its opposite end occupying its respective fulcrum hole 6 of standard 5 and adapted to operate pivotally and reciprocate therein.

By reference to the drawing it will be seen that two of the pries or levers 27 converge from the upper or lower ends respectively of the guideways to their respective fulcrum holes 6 and that the other pair occupy a horizontal plane, one withdrawn from and the other engaged with the cog wheel. Now as the primary power, manual or otherwise, turns the shaft 21 in the direction indicated by the contiguous arrow Fig. 3, the chains 14 are caused to operate in the direction indicated by the contiguous arrow same figure. Under this operation the horizontal levers or pries reciprocate and rock slightly on their respective fulcrums in opposite directions the one in engagement with the wheel 4 moving downward and rearward at its roller-equipped end and upward and forward at its rear end, this action by reason of the great advantage of leverage possessed by the primary power revolving said wheel 4 in the direction indicated by the arrow Fig. 3. At the same time the roller of the downwardly and rearwardly pitched lever or pry 26 starts downward in its trackway 8 and the roller of the upwardly and rearwardly pitched lever starts up its respective trackway 9, the result being a rearward sliding and barely perceptible upward pivotal movement of the rear end of the downwardly and rearwardly pitched lever and a pivotal or rocking movement of the rear end of the upwardly and rearwardly pitched lever.

It will also be noticed that the levers or pries are connected to the chains at equi-distant points so that in each revolution of a chain its roller-equipped levers shall each travel once throughout the entire length of each guideway, one descending in guideway 8 as the other ascends through guideway 9 and it will likewise be noticed that only one lever at a time of any particular chain can engage cog wheel 4, viz. the one descending through guideway 8, the front end of said lever or pry as it attains a certain position in its rearward and upward movement catching under a tooth of the wheel 4 and applying an upward pressure upon the same. As said lever attains a position in radial alinement with the fulcrum hole and the axis of wheel 4 its rear end is approximately engaged with the tooth at its base, the continued downward movement of the roller-equipped end of said lever resulting in raising and moving its rear end forwardly until it is totally disengaged from said tooth, it being understood that before one lever or pry releases the wheel, a second one engages and coöperates with the rotation of wheel 4, the movement of the latter being transmitted through the belt wheel 3 or other power transmitting device. In dotted lines Fig. 3, is indicated approximately the line of travel of the rear end of each lever or pry.

For the purpose of reducing the friction of each pair of counterbalanced levers or pries they are connected by endless cables 28 extending over pulleys 29 journaled in brackets or extensions 30 of brackets 10, said extensions, pulleys and cables only appearing in Figs. 1 and 2.

By reference to Fig. 5, it will be noticed that provision is made to prevent the rollers 23 from moving downward into grooves 9 after emerging therefrom in their upward travel or from moving upward in grooves 8 after attaining the lower end of the latter in their downward movement; the means for accomplishing this purpose being flat springs 31 and 32 respectively, the former projecting upwardly and the latter downward into the paths of the rollers as they are about to pass from grooves 9 into grooves 8 and from the latter into grooves 9; said springs yielding to accommodate such passage of the rollers and then immediately springing back to normal position for the purpose mentioned.

From the above description it will be apparent that I have produced a mechanical engine possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. The combination of a toothed wheel, a fulcrum, and a series of levers or pries for successive engagement with said wheel, and having a pivotal and sliding relation with said fulcrum.

2. The combination of a toothed wheel, a fulcrum, a series of levers or pries for successive engagement with said wheel and resting on said fulcrum, and means to impart an up and down movement to the front ends of said levers or pries to respectively effect the disengagement from and reëngagement with said toothed wheel, of their opposite ends.

3. The combination of a toothed wheel, a fulcrum, a series of levers or pries for successive engagement with said wheel and resting on said fulcrum, and means to cause said levers or pries to successively move downward at their front ends and in such movement engage and operate the toothed wheel, and then move upward successively to their original positions on a line forming an arc of a circle of which the fulcrum is the center.

4. The combination of a toothed wheel, a fulcrum, a standard having connecting guideways one of which is curved with the fulcrum as its center, a lever or pry having at one end a roller adapted to travel successively through said guideways and resting on said fulcrum near its opposite end with the last-named end adapted to operate pivotally and reciprocally and impart movement to said wheel.

5. The combination of a toothed wheel, a standard having a fulcrum hole, a second standard having guideways connected at their opposite ends, a lever or pry pivotally and slidingly engaging said fulcrum hole, a roller connected to the opposite end of the lever or pry, and means to cause said roller to travel successively through said guideways and impart intermittent rotary movement to said toothed wheel.

6. The combination of a toothed wheel, a standard having a fulcrum hole, a second standard having guideways connected at their opposite ends, a lever or pry pivotally and slidably engaging said fulcrum hole, a roller connected to the opposite end of the lever or pry, shafts coincidental with the connected ends of said guideways, sprocket wheels mounted thereon, a chain connecting the sprocket wheels, a link connecting the lever and chain, and means to impart movement to the latter for the purpose set forth.

7. The combination of a toothed wheel, a standard having fulcrum holes, a second standard having guideways connected at their opposite ends, a lever or pry pivotally and slidingly engaging each fulcrum hole, rollers connected to the opposite ends of said levers or pries, shafts coincidental with the connected ends of the guideways, sprocket wheels thereon, chains connecting the sprocket wheels, links pivotally connecting the chains and the levers or pries, a primary shaft, and means to transmit motion from the said primary shaft to said sprocket wheels.

8. The combination of a toothed wheel, a standard having fulcrum holes, a second standard having guideways connected at their opposite ends, a lever or pry pivotally and slidingly engaging each fulcrum hole, rollers connected to the opposite ends of said levers or pries, shafts coincidental with the connected ends of the guideways, sprocket wheels thereon, chains connecting the sprocket wheels, links pivotally connecting the chains and the levers or pries, a primary shaft, means to transmit motion from said shaft to said sprocket wheels, a pulley for each standard, and a cable engaging said pulley and connected at its opposite ends to the levers or pries of each standard.

In testimony whereof I affix my signature, in the presence of two witnesses.

JOHN C. WILLIAMS.

Witnesses:
H. C. RODGERS,
G. Y. THORPE.